United States Patent
Bruno et al.

(10) Patent No.: US 6,710,367 B1
(45) Date of Patent: Mar. 23, 2004

(54) MULTIPLE QUANTUM WELL SEMICONDUCTOR OPTICAL MODULATOR

(75) Inventors: John D. Bruno, Bowie, MD (US); Mary S. Tobin, Silver Spring, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 10/146,944

(22) Filed: May 17, 2002

(51) Int. Cl.[7] .............................................. H01L 29/06
(52) U.S. Cl. .............................. 257/17; 257/22; 257/25; 438/48
(58) Field of Search ............................. 257/12, 14, 15, 257/17, 21, 22, 25; 438/48

(56) References Cited

U.S. PATENT DOCUMENTS 5,105,301 A * 4/1992 Campi ........................ 359/245
5,416,338 A * 5/1995 Suzuki et al. ................. 257/21

* cited by examiner

Primary Examiner—Nathan J. Flynn
Assistant Examiner—Scott Wilson
(74) Attorney, Agent, or Firm—William Randolph (57) ABSTRACT

A quantum-confined Stark effect semiconductor optical modulator, operable to modulate light of a particular wavelength in the range of around 780 to 840 nm. A p-i-n diode having p, intrinsic and n regions, as well as first and second electrical contacts for application of a reverse bias voltage defines the modulator. The particular intrinsic region includes a plurality of semiconductor layers defining a plurality of quantum wells separated by barrier layers having a certain bandgap energy above that of the quantum wells. The quantum wells including at least two ultra-thin barrier layers within the quantum well and being of a material having a certain bandgap energy above that of the quantum wells. The width of each ultra-thin barrier layer is no more than approximately two molecular layers thick.

18 Claims, 8 Drawing Sheets

MULTIPLE QUANTUM WELL SEMICONDUCTOR OPTICAL MODULATOR

CROSS-REFERENCE TO RELATED APPLICATIONS

The present application claims the benefit of priority of U.S. provisional patent application Ser. No. 60/282,367 filed on Apr. 9, 2001, which is hereby expressly incorporated by reference.

STATEMENT OF GOVERNMENT INTEREST

The invention described herein may be manufactured and used by or for the Government of the United States of America for government purposes without the payment of any royalties therefor.

BACKGROUND OF THE INVENTION

Various systems utilizing laser beams for conveying information require a device for controlling the beam in accordance with the information. A prevalent form of such device is an optical modulator comprised of a semiconductor structure. More particularly, semiconductor p-i-n diodes are utilized to modify the transmission, or reflection, of a laser beam passed through or incident upon the diode.

The i, or intrinsic region of the diode, in one form, includes a plurality of semiconductor layers which define multiple quantum wells distributed between the p and n regions, with the structure imparting certain absorption characteristics to the diode. That is, when a laser beam of a certain wavelength $\lambda_0$ impinges upon the diode, a certain, relatively low, absorption is experienced for that wavelength. When a reverse bias is applied to the diode, the absorption characteristic is shifted toward a longer wavelength such that wavelength $\lambda_0$ now will experience a greater absorption. This is known as the quantum-confined Stark effect and the difference in absorption without, and with, the reverse bias is then used to convey information.

Existing multiple quantum well semiconductor optical modulators, utilizing, for example, GaAs (gallium arsenide) as the semiconductor, are operated at room temperature and at wavelengths in the range of around 850 nm (nanometers) to 860 nm, relatively near the bandgap energy of the semiconductor. These optical modulators however cannot be effectively used at wavelengths significantly above the GaAs bandgap energy, for example, at wavelengths in the range of around 780 nm to 840 nm. Recently, continuous wave laser diodes in this 780 nm to 840 nm range have become commercially available. Modulators are needed for these lasers for applications related to optical networks and free-space communications for satellites and aircraft. High-power 810 nm lasers have been developed and have been used in prototype laser radar systems (LADAR) and a particular need exists for a room temperature semiconductor optical modulator that works effectively at this, as well as other wavelengths in the 780 nm to 840 nm range. The present invention meets these needs.

SUMMARY OF THE INVENTION

A quantum-confined Stark effect semiconductor optical modulator is described, which is operable to modulate light of a particular wavelength in the range of around 780 to 840 nm. The modulator includes a p-i-n diode having p, intrinsic and n regions, as well as first and second electrical contacts for application of a voltage. A modulating voltage source is operable to apply a reverse bias to the first and second contacts. The intrinsic region has a plurality of semiconductor layers defining a plurality of quantum wells having a certain bandgap energy, separated by barrier layers having a certain bandgap energy above that of the quantum wells. The quantum wells include at least two ultra-thin intra-well barrier layers within the quantum well, the ultra-thin barrier layers being of a material having a certain bandgap energy above that of the quantum wells. The width of each ultra-thin intra-well barrier layer is no more than approximately two molecular layers thick. In a preferred embodiment two ultra-thin intra-well barriers are provided thus defining a triple quantum well structure.

BRIEF DESCRIPTION OF THE DRAWINGS

The invention will be better understood, and further objects, features and advantages thereof will become more apparent from the following description of the preferred embodiment, taken in conjunction with the accompanying drawings, in which.

DETAILED DESCRIPTION OF THE PREFERRED EMBODIMENTS

In the drawings, which are not to scale, like or corresponding parts are denoted by like or corresponding reference numerals.

Figure 1:
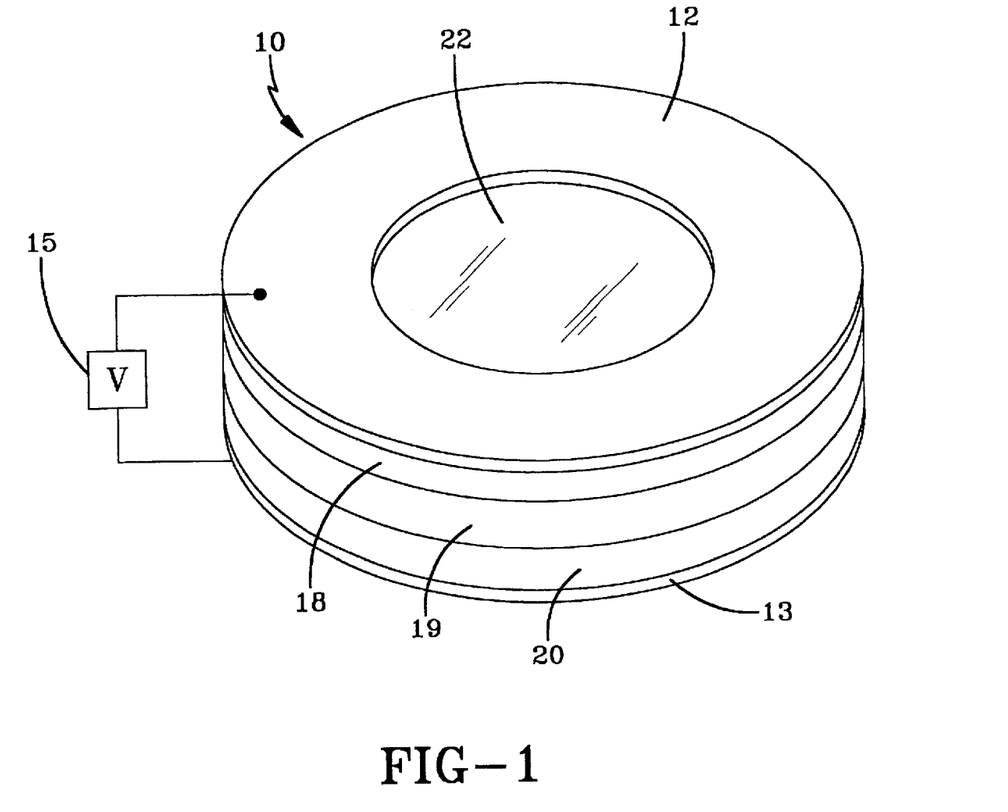
FIG. 1 is a view of a p-i-n diode.

FIG. 1 illustrates a p-i-n diode 10 having top and bottom electrical contacts 12 and 13 connected to a voltage source 15. Interposed between the contacts 12 and 13 are respective p, i (intrinsic) and n layers, or regions, 18, 19 and 20. The p-i-n diode 10 is used in one type of optical modulator, and when so used, at least top contact 12 is generally annular, defining a central aperture 22 to allow passage of laser light to be modulated. Such modulation is accomplished by the application of certain voltages from the voltage source 15.

Figure 2A:
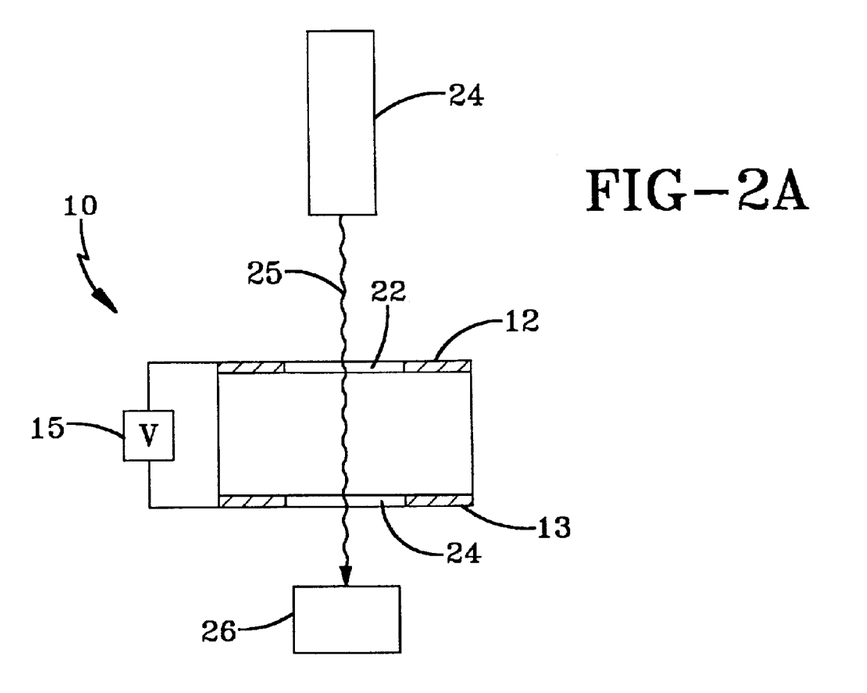
FIGS. 2A and 2B illustrate the p-i-n diode of FIG. 1 in two forms of optical modulators.
Figure 2B:
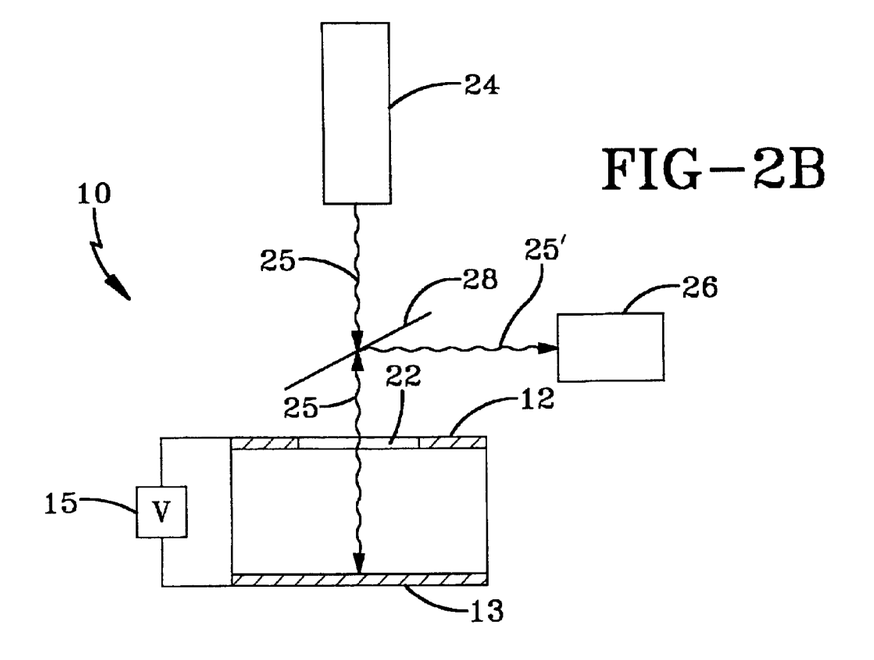

FIGS. 2A and 2B illustrate, in partial cross-section, two types of modulators, namely, a transmissive type as in FIG. 2A and a reflective type, as in FIG. 2B. In FIG. 2A, a laser 24 is operable to generate a light beam 25 (photons) directed through the central aperture 22 of top contact 12. The bottom contact 13 is also generally annular and includes a central aperture 24, allowing the light beam, suitably modulated, to pass entirely through the p-i-n diode 10 to a utilization system 26.

In the reflective type of modulator, as illustrated in FIG. 2B, the light beam 25 is reflected back and is directed, as light beam 25', to utilization system 26, by means of a partially reflecting mirror 28.

The term "light" as used herein is meant to apply to a generated wave of a particular wavelength, not necessarily in the visible portion of the electromagnetic spectrum. In the present invention the wavelengths discussed are in the infrared portion of the electromagnetic spectrum.

Figure 3:
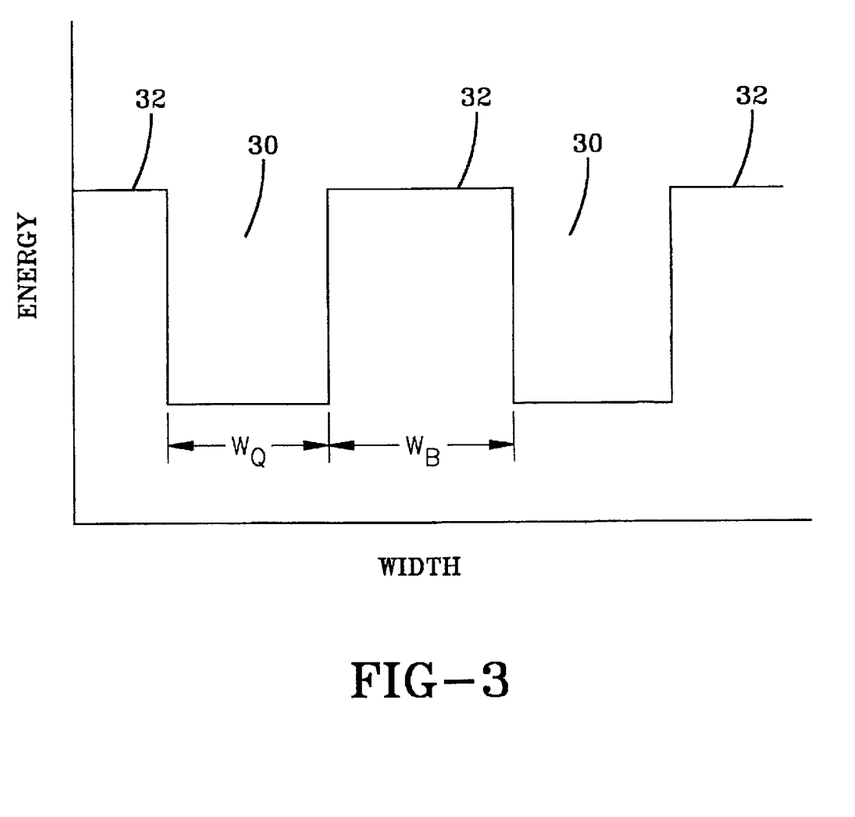
FIG. 3 serves to illustrate the concept of a quantum well.

FIG. 3 illustrates the principle of a quantum well. Basically, and as background, semiconductor crystals have an associated bandgap energy which is the energy needed to break an electronic bond in the semiconductor. When light with photonic energy greater than this bandgap energy shines on the semiconductor crystal, an electron can absorb enough energy from an impinging photon to cause the electron to leave the valence band and jump to a conduction band, leaving a "hole", which is the absence of an electron. The holes and electrons can move together in a correlated manner through the crystal. The electrically neutral, "tiny atoms" of holes and electrons, when bound together in the crystal, are known as "excitons". After a time period, the electron again reverts to its valence state. The minimum energy that can be absorbed corresponds to the creation of the electron and hole corresponding to the lowest allowed energy level for the heavy hole exciton.

In FIG. 3, in which energy is plotted on the vertical axis and width on the horizontal axis, numerals 30 represent quantum wells of width $W_Q$ sandwiched between inter-well barriers 32 of width $W_B$. The quantum wells 30 are layers of a semiconductor having a particular bandgap, while barriers 32 are of a semiconductor material having a greater bandgap than that of the wells 30. In such instance, quantum wells are formed between the barriers. When the structure is subjected to light of a particular wavelength, having an associated energy which is above the bandgap of the well material, there is a certain probability of the light being absorbed in the well and generating an electron-hole pair, which to a high degree of probability will be confined in the well. One type of semiconductor material used in such structures is GaAs. More particularly, GaAs is the semiconductor of choice for the wells 30 and an alloy of GaAs, AlGaAs, (aluminum gallium arsenide) is used for the barriers 32.

The term "multiple quantum well" as commonly used by those skilled in the art, refers to a structure grown with many identical quantum wells with sufficiently large inter-well separation (barrier 32) that the quantum wells are uncoupled, and their optical properties remain independent. Whereas FIG. 3 shows two quantum wells, a useful modulator structure might include 70 quantum wells.

Figure 4A:
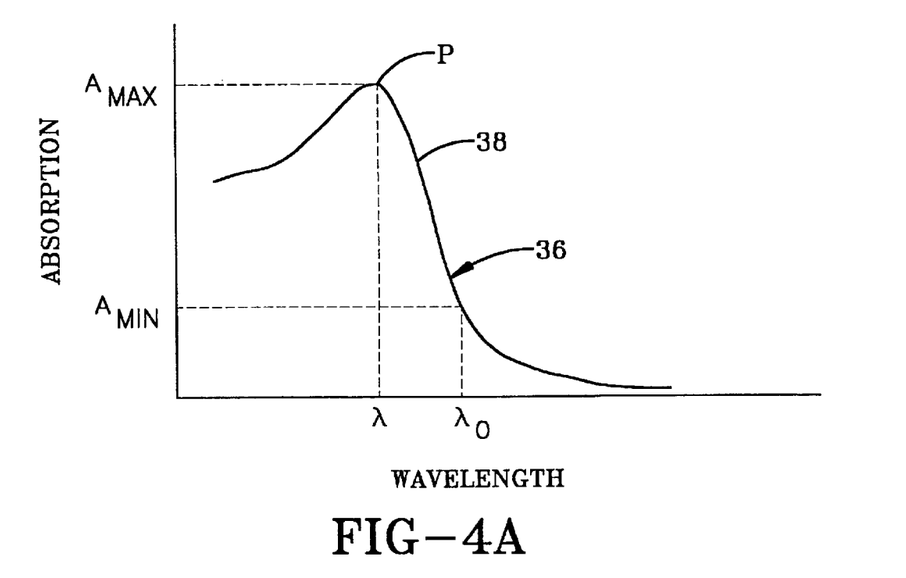
FIG. 4A illustrates a curve of absorption of energy in a quantum well as a function of wavelength.
Figure 4B:
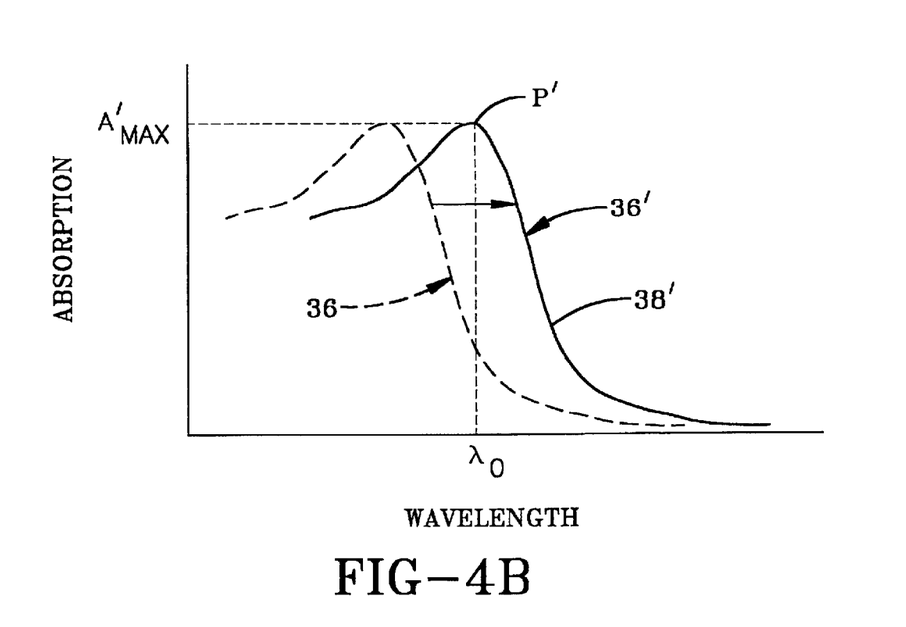
FIG. 4B illustrates the curve of FIG. 4A as shifted by the application of a reverse bias.

The present invention uses the well-known quantum-confined Stark effect to accomplish modulation of lasers that generate light in the wavelength range of around 780 nm to 840 nm, previously not satisfactorily done with present day apparatus. FIGS. 4A and 4B illustrate this effect. Curve 36 of FIG. 4A represents the absorption of energy in a quantum well as a function of the wavelength of the energy, that is, as a function of the wavelength of the light impinging upon the semiconductor. The curve can also represent the total absorption of multiple quantum wells as is found in the p-i-n diode 10. Curve 36 represents the absorption characteristic with a first electrical bias applied to the diode, for example zero volts.

Curve 36 has a fairly sharp edge 38 and a peak P (known as the "exciton peak") such that if light of wavelength $\lambda$ impinges upon the semiconductor, maximum, or near maximum light will be absorbed. This is designated on the absorption axis as $A_{max}$. If however, the actual desired operating wavelength is greater than $\lambda$, namely at $\lambda_O$, then a less amount of light will be absorbed. This is designated on the absorption axis as $A_{min}$.

If a reverse bias is now applied to the quantum well structure by the voltage source 15 (FIG. 1), the curve 36 will shift to a new position to the right, as indicated by curve 36' in FIG. 4B. The shift is such that the exciton peak P' of curve 36' is now positioned at the desired operating wavelength $\lambda_O$, producing a corresponding absorption of $A'_{max}$. Curves 36 and 36' are idealized waveforms and when the shift occurs, curve 36' may not be exactly identical to curve 36, due to exciton broadening, which is also a manifestation of increased electric field. Even though the curves may not be identical, the difference in absorption $A'_{max}-A_{min}$ (or any other significant difference) with, and without reverse bias, will be sufficient to accomplish, by operation of the voltage source 15, desired modulation for the utilization system 26 (FIGS. 2A and 2B).

The above example corresponds to operation at a wavelength greater than that corresponding to the exciton peak, however it is to be noted that there will be a range of possible wavelengths, including the zero-bias exciton peak wavelength, over which the modulator can operate.

By way of background, the width of the quantum well is of particular importance in that the well width determines at what wavelength the desired exciton peak will occur. The peak of the absorption curve will shift to shorter wavelengths with narrower wells. However, if a well is made narrower so as to absorb at a wavelength shorter than the conventional 850 to 860 nm range, for example absorption at a desired 810 nm, the quantum-confined Stark effect shift becomes much less pronounced, resulting in less than satisfactory modulation operation.

In the present invention the p-i-n diode 10 is fabricated with multiple quantum wells, each having two ultra-thin barriers added within the well, that is, intra-well barriers. Such "triple quantum well" structure is known. For example, triple quantum well modulators exist, however, they have relatively thick intra-well barriers and operate according to a completely different theory of operation; that is, one of spatial separation of carriers and resonances, as opposed to the quadratic quantum-confined Stark effect. Further, such triple quantum well modulators generally must operate at extremely low temperatures necessitating cryogenic apparatus.

The particular fabrication of the layers of the p-i-n diode 10 forming the triple quantum wells, in accordance with the teachings of the present invention, results in a modulator that can operate at room temperature (20 to 25° C.) and in the wavelength region of around 780 nm to around 840 nm, significantly above the bandgap of the GaAs semiconductor utilized and below the wavelengths of existing p-i-n diode modulators. It is to be noted that a certain energy is associated with a particular wavelength, and the energy increases with decreasing wavelength. The wavelength associated with the GaAs bandgap is around 871.6 nm.

Basically, an optical modulator having multiple quantum wells is disclosed herein with each well having at least two ultra-thin intra-well barriers. The width of an intra-well barrier, in accordance with the present invention, ranges from approximately one molecular layer to two molecular layers of the barrier material. This construction has the effect of moving the absorption peak P to a shorter wavelength. The desired wavelength of operation will determine the choice of the number and thickness of barriers and well width. The construction mimics the behavior of a single quantum well in how it exhibits the quantum-confined Stark effect, however at a higher photonic energy (shorter wavelength) and without the requirement for cryogenic cooling.

Figure 5:
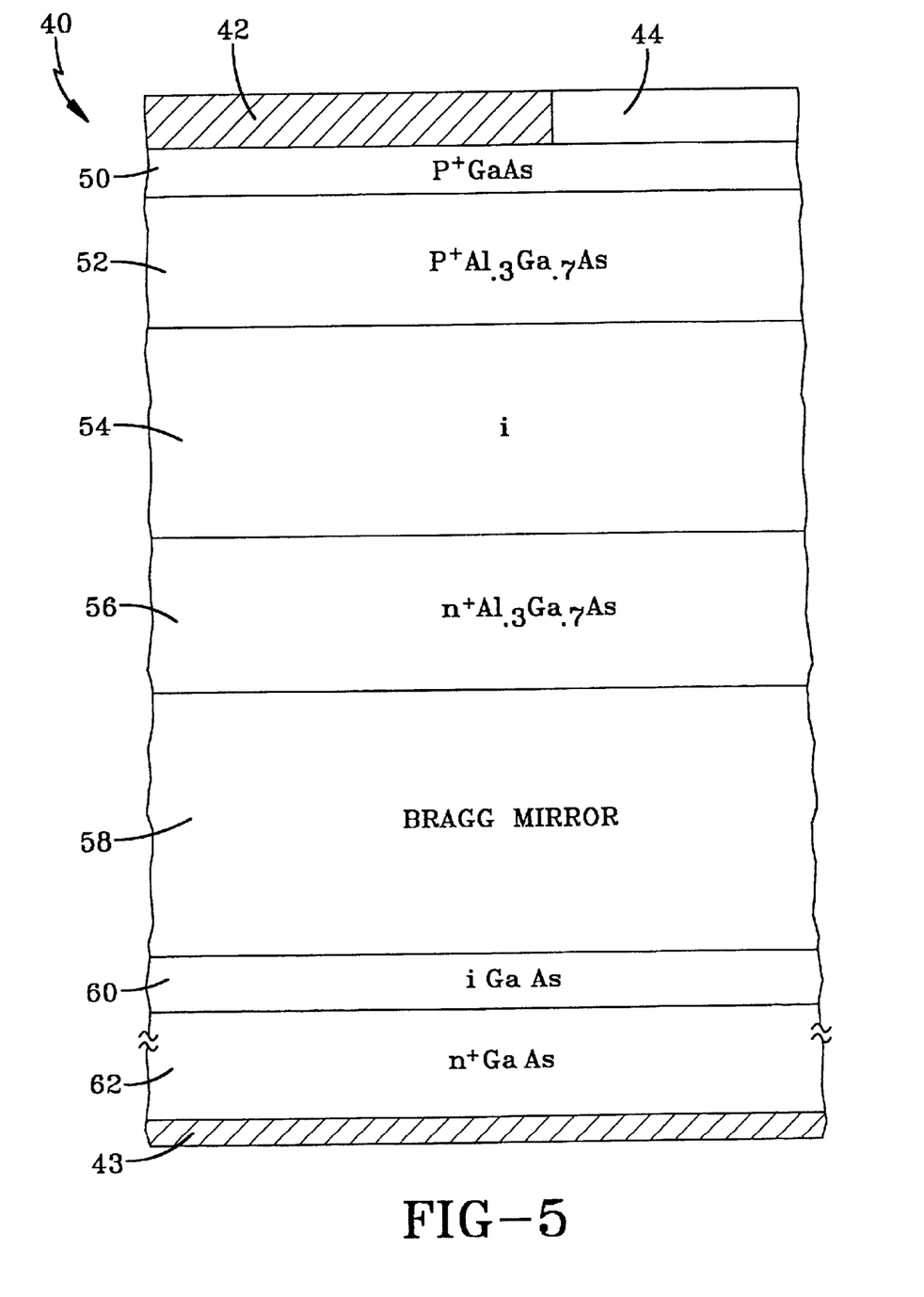
FIG. 5 illustrates a cross-section of a p-i-n diode modulator in accordance with the present invention.
Figure 5A:
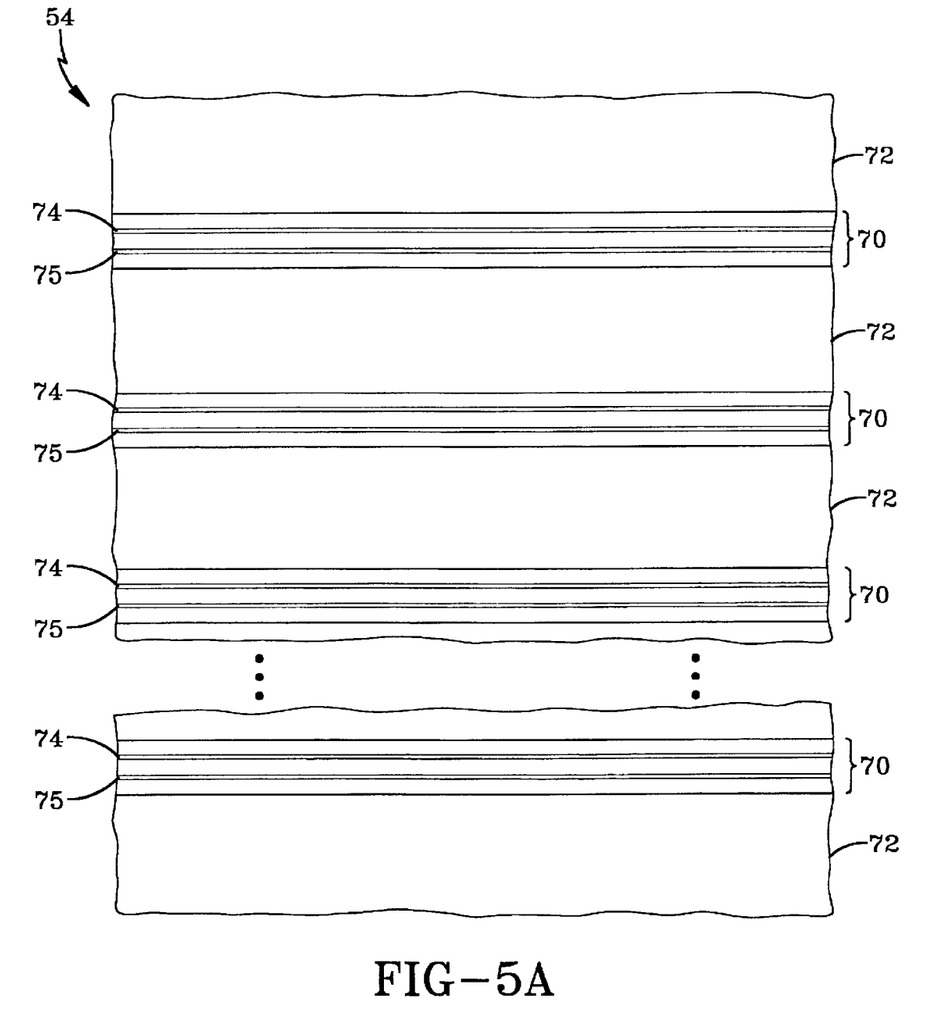
FIG. 5A illustrates the intrinsic region of the diode of FIG. 5, in more detail.

FIGS. 5 and 5A are sectional views, not to scale, of one actual embodiment of the present invention. As illustrated in FIG. 5, p-i-n diode 40 includes top and bottom metal contacts 42 and 43, with the top contact including an aperture 44 to allow impingement of a laser beam of a particular wavelength.

The structure 40, designed to operate at a wavelength of around 810 to 815 nm, by way of example, includes a p+GaAs region, or layer, 50 and a p+AlGaAs layer 52. Adjacent the p+AlGaAs layer 52 is the intrinsic layer 54 (to be described in conjunction with FIG. 5A), followed by an n+AlGaAs layer 56. If the modulator is of the reflective type, as in FIG. 2B, it will include a reflector layer, such as a Bragg mirror 58, also known as a distributed Bragg reflector. As is well known to those skilled in the art, a distributed Bragg reflector is comprised of a plurality of layers of high refractive index material, such as AlGaAs and low refractive index material such as AlAs (aluminum arsenide). The next layer 60 is an intrinsic GaAs buffer layer, with all of the above layers being sequentially deposited on n+GaAs substrate member 62. Thicknesses for the various layers on the substrate member are given in Table 1.

TABLE 1

| Numeral | Layer | Thickness (nm) |
|---|---|---|
| 50 | p+ GaAs | 5 |
| 52 | p+ AlGaAs | 500 |
| 54 | i | 1000 |
| 56 | n+ AlGaAs | 750 |
| 58 | Bragg mirror | 1900 |
| 60 | i GaAs | 250 |

The intrinsic region 54 is illustrated in more detail in FIG. 5A. Intrinsic region 54 includes a plurality of triple quantum wells 70, of GaAs, separated by barrier layers 72, of AlGaAs. By way of example, seventy triple quantum wells were fabricated in the structure. Each quantum well 70 includes ultra-thin barrier layers 74 and 75, of AlGaAs, each having an average thickness of around two molecular layers, fabricated, by means of well-known molecular beam epitaxial growth procedures. In the structure illustrated in FIGS. 5 and 5A, the AlGaAs layers 52, 56, 72, 74 and 75 have a mole fraction composition of $Al_{0.3}Ga_{0.7}As$, although other mole fraction compositions are possible. A corresponding energy diagram, with thicknesses, of a few triple quantum wells 70 of the structure of FIG. 5A is illustrated in FIG. 6.

Figure 6:
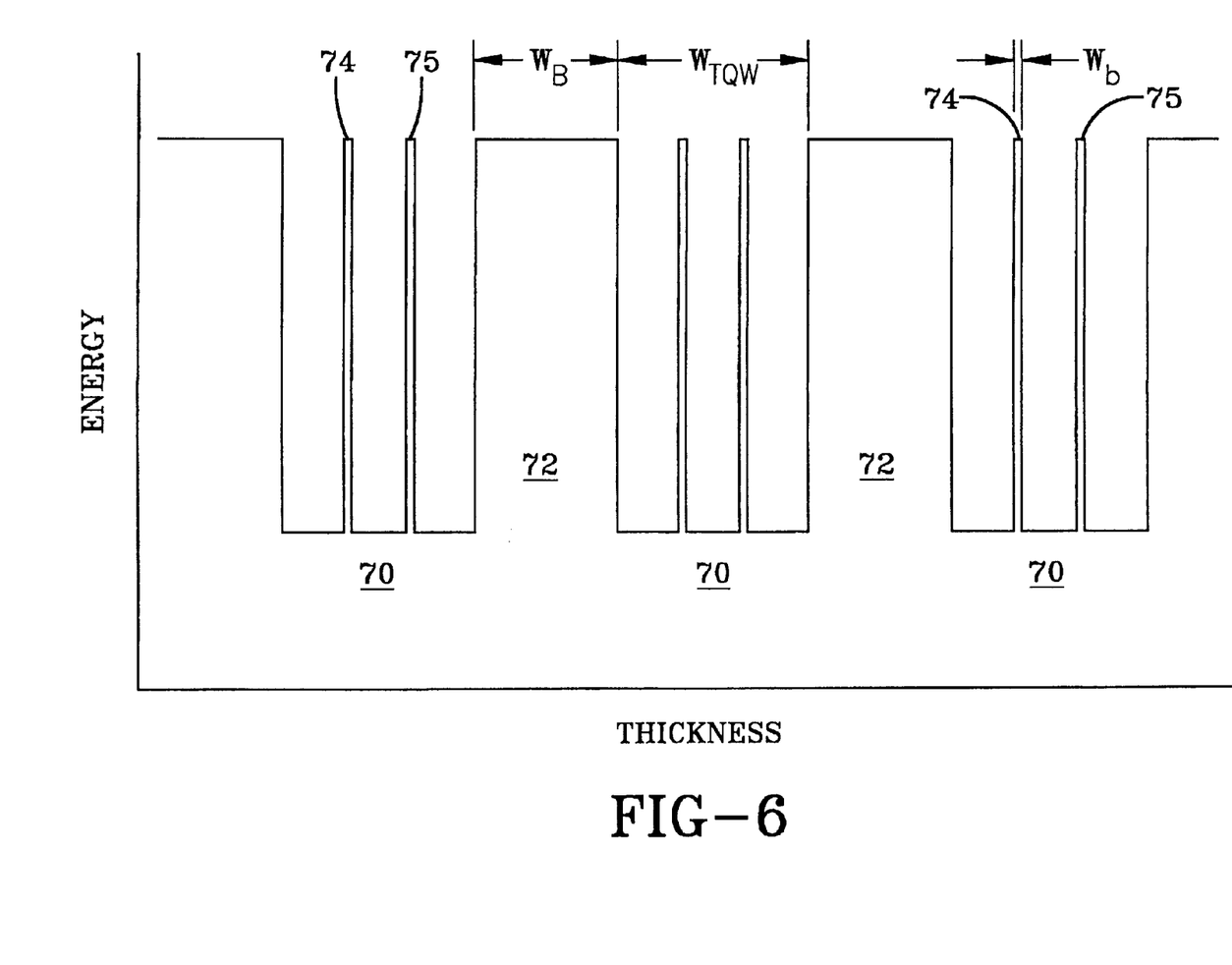
FIG. 6 illustrates the triple quantum wells used in the present invention.

In FIG. 6, the thickness $W_B$, of an inter-well barrier 72, between triple quantum wells 70, is sufficient to prevent quantum mechanical coupling between the triple quantum wells, 6.5 nm being exemplary. The width $W_{TQW}$ of a triple quantum well 70 is 7.9 nm, and in general, a structure in accordance with the present invention would have a width in the range of around 6.5 to 10 nm. The width $W_b$ of each ultra-thin intra-well barrier 74 or 75 is two molecular layers (approximately 0.57 nm), and in general, a structure in accordance with the present invention would have two or more such barriers, each having a thickness of about one to two molecular layers.

Figure 7:
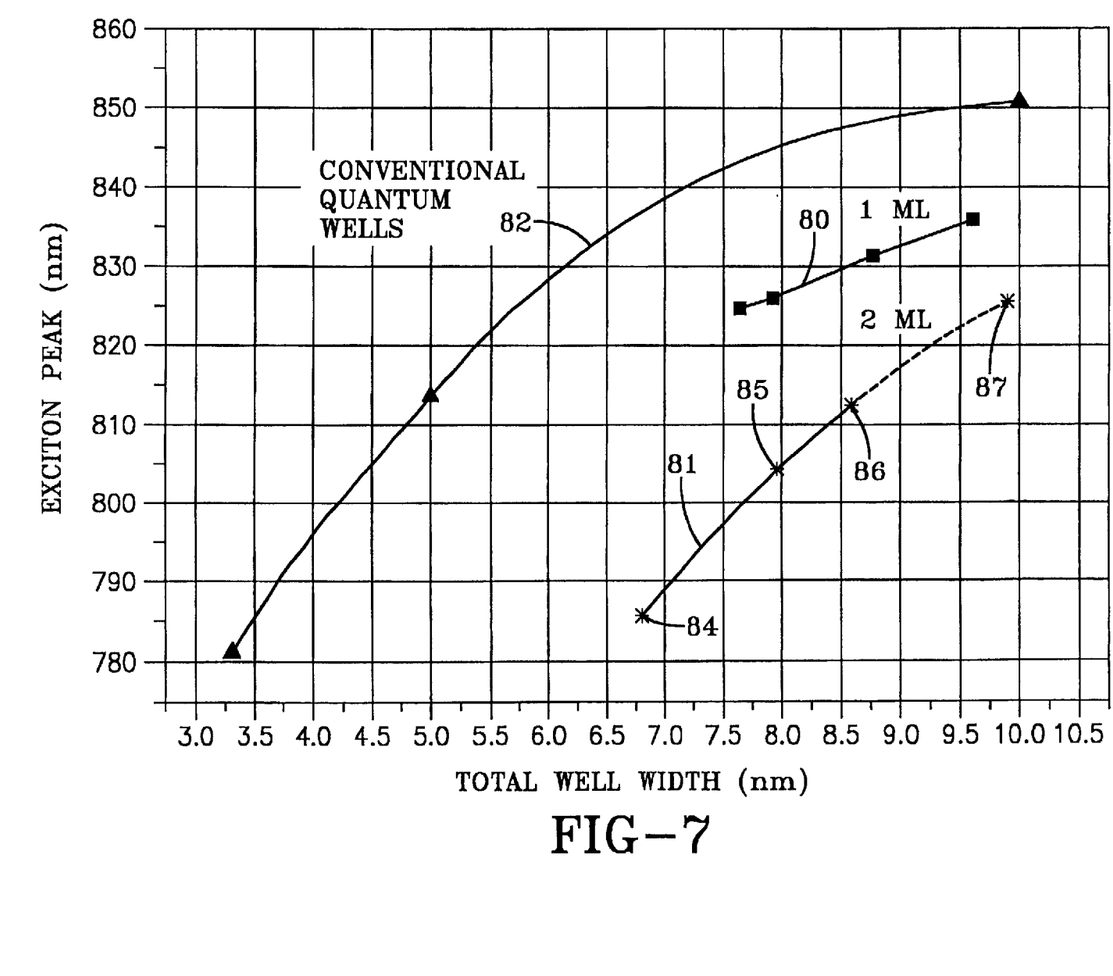
FIG. 7 shows curves illustrating the relationship of exciton peak with quantum well width.

In FIG. 7, curves 80 and 81 are plots illustrating the relationship of exciton peak with well width for a triple quantum well structure, that is with two ultra-thin AlGaAs barriers within the GaAs well, as previously described. Curve 80 illustrates the theoretical relationship with an ultra-thin barrier of a single molecular layer (ML). Curve 81 is for an ultra-thin barrier of two molecular layers and is drawn using experimental data from three embodiments of the invention, points 84, 85 and 86, in addition to a calculated point, 87, at a well width of around 9.7 nm. In addition, curve 82 represents the relationship for the prior art conventional multiple quantum well modulator. These curves show the relationship with zero applied voltage, that is, with no reverse bias.

These curves illustrate that for a given exciton peak, the well width, for the present invention, as exemplified by curves 80 and 81, is wider than the conventional modulator, as depicted by curve 82. This wider well-width ensures that a greater quantum-confined Stark effect shift will take place resulting in a more efficient modulator at the shorter wavelengths. For example, for operation at 815 nm, with barrier thicknesses of two monolayers (curve 81), the width of the triple quantum well would be around 8.5 nm, as opposed to 5.1 nm for the conventional case (curve 82).

Although curves 80 and 81 of FIG. 7 are plots for a triple quantum well (two intra-well barriers), the addition of more such barriers in the well would shift each of the curves downwards.

Thus, by fabricating the p-i-n diode with an intrinsic region of alternating quantum wells, each of a total thickness of around 6.5 to 10 nm, and inter-well barrier layers, with one or more ultra-thin barrier layers within the quantum well, and of a thickness of around one to two molecular layers, a room temperature modulator may be designed to meet the requirements of operation at high energy wavelengths of around 780 to 840 nm. This is accomplished by the application of a reverse bias of a magnitude to ensure a sufficient absorption difference with, and without the bias.

After reading the foregoing specification, one of ordinary skill in the art will be able to effect various changes, substitutions of equivalents and various other aspects of the present invention as broadly disclosed herein. It is therefore intended that the protection granted hereon be limited only by the definition contained in the appended claims and equivalents. Having thus shown and described what is at present considered to be the preferred embodiment of the present invention, it should be noted that the same has been made by way of illustration and not limitation. Accordingly, all modifications, alterations and changes coming within the spirit and scope of the present invention are herein meant to be included.

What is claimed is:

1. A quantum-confined Stark effect semiconductor optical modulator, operable to modulate light of a particular wavelength in the range of around 780 to 840 nm, comprising:
    a p-i-n diode having p, intrinsic and n regions, as well as first and second electrical contacts for application of a voltage;
    a modulating voltage source for applying a reverse bias to said first and second contacts;
    said intrinsic region having a plurality of semiconductor layers defining a plurality of quantum wells having a certain bandgap energy, separated by inter-well barrier layers having a certain bandgap energy above that of said quantum wells;
    said quantum wells including at least two ultra-thin intra-well barrier layers within said quantum well, said ultra-thin intra-well barrier layers being of a material having a certain bandgap energy above that of said quantum wells;
    the width of each said ultra-thin intra-well barrier layer being no more than two molecular layers thick.

2. A modulator according to claim 1 wherein:
    said semiconductor layers are of gallium arsenide; and said barrier layers and said ultra-thin barrier layers are of aluminum gallium arsenide.

3. A modulator according to claim 2 wherein:

the width of each said quantum well ranges from around 6.5 nm to 10 nm.

4. A modulator according to claim 2 wherein:

said aluminum gallium arsenide has a mole fraction composition of $Al_{0.3}Ga_{0.7}As$ .

5. A modulator according to claim 1 wherein:

said quantum well includes two said ultra-thin barrier layers thereby defining a triple quantum well.

6. A modulator according to claim 1 wherein:

said voltage source applies a modulating waveform of zero bias and reverse bias.

7. A modulator according to claim 1 wherein:

said intrinsic region includes around 70 said quantum wells.

8. A modulator according to claim 1 wherein:

said inter-well barrier layers have a thickness of around 6.5 nm.

9. A modulator according to claim 1, wherein:

the width of each said ultra-thin intra-well barrier layer is equal to or less than 0.57 nanometers.

10. A quantum-confined Stark effect semiconductor optical modulator, operable to modulate light of a particular wavelength in the range of around 780 to 840 nm, comprising:

a p-i-n diode having p, intrinsic and n regions, as well as first and second electrical contacts for application of a voltage;

a modulating voltage source for applying a reverse bias to said first and second contacts;

said intrinsic region having a plurality of semiconductor layers defining a plurality of quantum wells having a certain bandgap energy, separated by inter-well barrier layers having a certain bandgap energy above that of said quantum wells;

said quantum wells including at least two ultra-thin intra-well barrier layers within said quantum well, said ultra-thin intra-well barrier layers being of a material having a certain bandgap energy above that of said quantum wells;

the width of each said ultra-thin intra-well barrier layer is equal to or less than 0.57 nanometers.

11. A modulator according to claim 10 wherein:

said semiconductor layers are of gallium arsenide; and said barrier layers and said ultra-thin barrier layers are of aluminum gallium arsenide.

12. A modulator according to claim 11 wherein:

the width of each said quantum well ranges from around 6.5 nm to 10 nm.

13. A modulator according to claim 11 wherein:

said aluminum gallium arsenide has a mole fraction composition of $Al_{0.3}Ga_{0.7}As$.

14. A modulator according to claim 10 wherein:

said quantum well includes two said ultra-thin barrier layers thereby defining a triple quantum well.

15. A modulator according to claim 10 wherein:

said voltage source applies a modulating waveform of zero bias and reverse bias.

16. A modulator according to claim 10 wherein:

said intrinsic region includes around 70 said quantum wells.

17. A modulator according to claim 10 wherein:

said inter-well barrier layers have a thickness of around 6.5 nm.

18. A quantum-confined Stark effect semiconductor optical modulator, operable to modulate light of a particular wavelength in the range of around 780 to 840 nm, comprising:

a p-i-n diode having p, intrinsic and n regions, as well as first and second electrical contacts for application of a voltage;

a modulating voltage source for applying a reverse bias to said first and second contacts;

said intrinsic region having a plurality of semiconductor layers defining a plurality of quantum wells having a certain bandgap energy, separated by inter-well barrier layers having a certain bandgap energy above that of said quantum wells;

said quantum wells including at least two ultra-thin intra-well barrier layers within said quantum well, said ultra-thin intra-well barrier layers being of a material having a certain bandgap energy above that of said quantum wells;

the width of each said ultra-thin intra-well barrier layer being equal to or less than two molecular layers thick.

* * * * *